Figure 7:
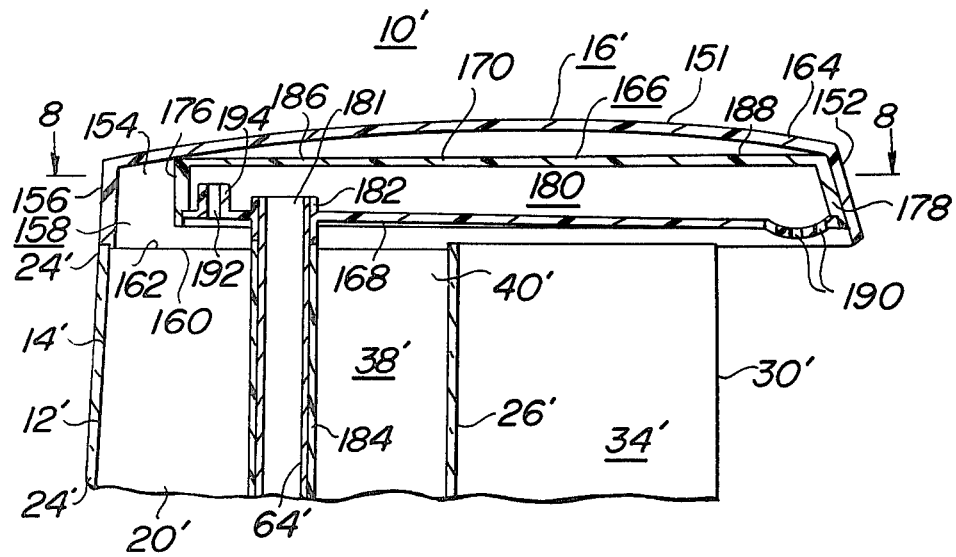

United States Patent [19]

Bergmann et al.

[11] 4,103,603

[45] Aug. 1, 1978

[54] AUTOMATIC COFFEE BREWING DEVICE

[75] Inventors: Karl H. Bergmann, Cherry Hill, N.J.; Harvey Levine, Fairfield, Conn.

[73] Assignee: Melitta, Inc., Cherry Hill, N.J.

[21] Appl. No.: 627,476

[22] Filed: Oct. 31, 1975

Related U.S. Application Data

[63] Continuation-in-part of Ser. No. 490,063, Jul. 19, 1974, abandoned.

[51] Int. Cl.² ............................................. A47J 31/00
[52] U.S. Cl. ........................................ 99/294; 99/298; 99/304
[58] Field of Search ................. 99/294, 275, 279–280, 99/281–282, 283–284, 285, 290, 293, 300–301, 302, 304, 307, 313, 309–312, 288, 289, 292; 126/344, 350, 380, 387; 219/441

[56] References Cited

U.S. PATENT DOCUMENTS

| 2,574,587 | 11/1951 | Parnes et al. | 126/387 X |
| 2,756,667 | 7/1956 | Burns | 99/292 X |
| 2,846,938 | 8/1958 | Brandl | 99/281 |
| 2,926,234 | 2/1960 | Palmer | 99/281 X |
| 3,100,434 | 8/1963 | Bunn | 99/282 |
| 3,323,441 | 6/1967 | Manship et al. | 99/313 X |
| 3,535,493 | 10/1970 | Schwartz, Jr. et al. | 219/441 |
| 3,701,883 | 10/1972 | Tilp | 99/310 X |
| 3,793,933 | 2/1974 | Weber | 99/283 |
| 3,808,961 | 5/1974 | Grossenbacher | 99/281 |
| 3,869,968 | 3/1975 | Ihlenfeld | 99/294 X |

Primary Examiner—Harvey C. Hornsby
Assistant Examiner—Arthur O. Henderson
Attorney, Agent, or Firm—Jacob Trachtman

[57] ABSTRACT

An automatic coffee brewing device comprising a structure having a cavity therein providing a reservoir for receiving water, a water heating and pumping means positioned under the reservoir, and a connecting means for delivering water from the reservoir to the heating and pumping means. A cover member is received over and enclosing a top opening of the structure, and may include or have a separate water dispensing means with said bottom and top walls enclosing a chamber therein, said dispensing means also having a first opening over the reservoir of the structure for removably receiving therethrough the top end of the riser tube of the pump, a second opening for providing a water dispensing spout, and a third opening over the reservoir of the structure for venting and returning heated fluid to the reservoir.

7 Claims, 9 Drawing Figures

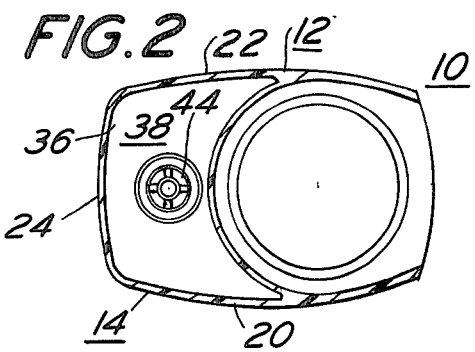
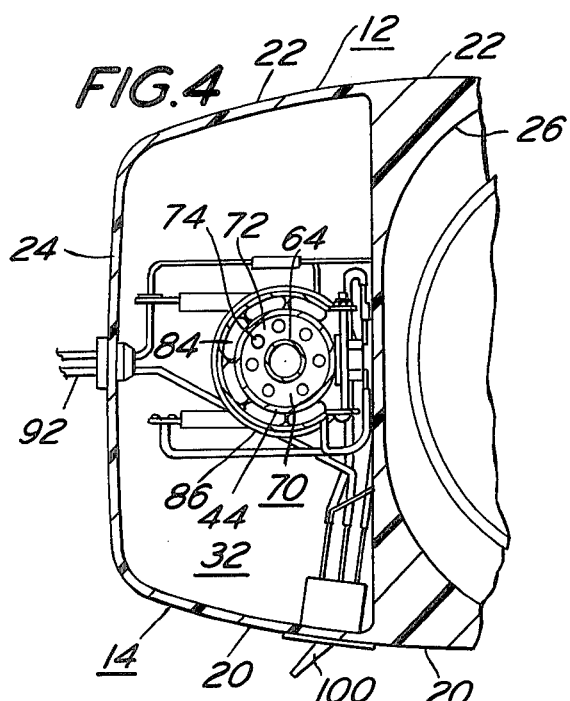
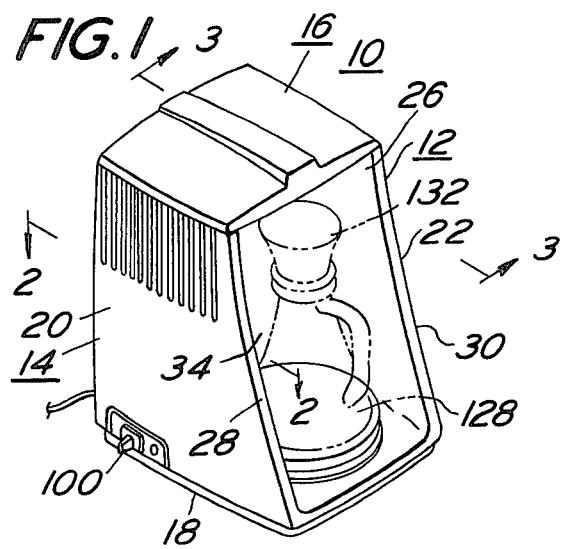
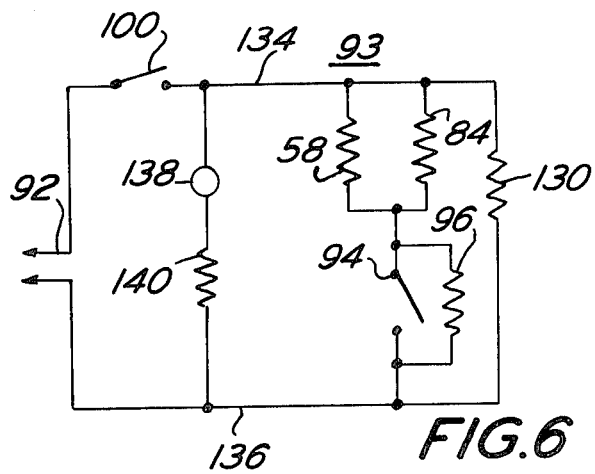
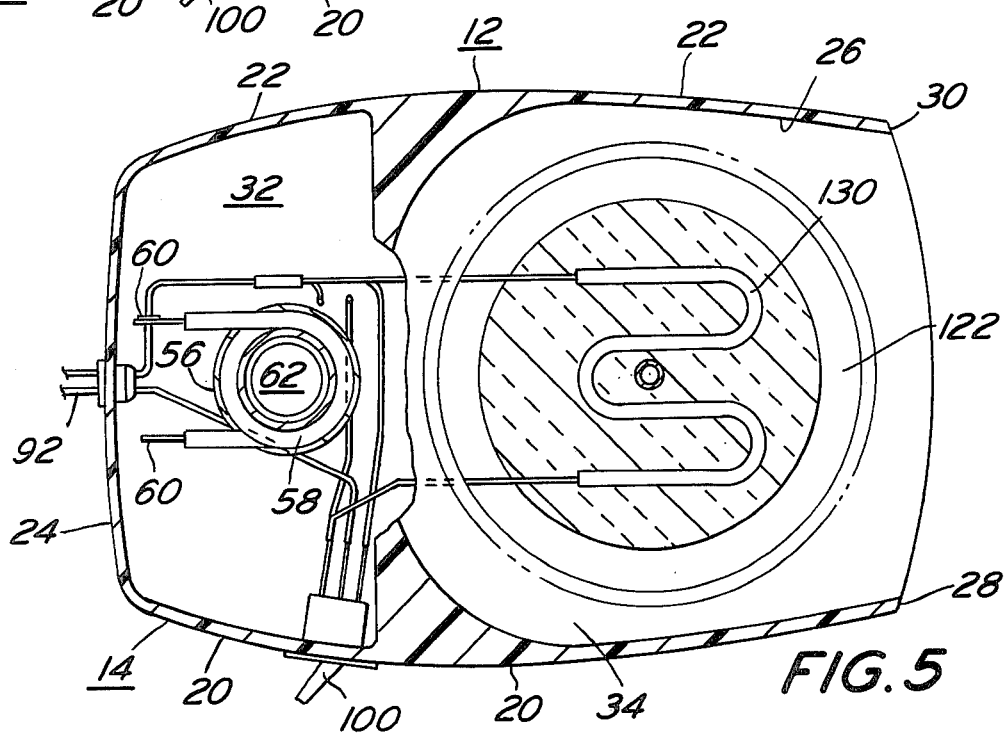

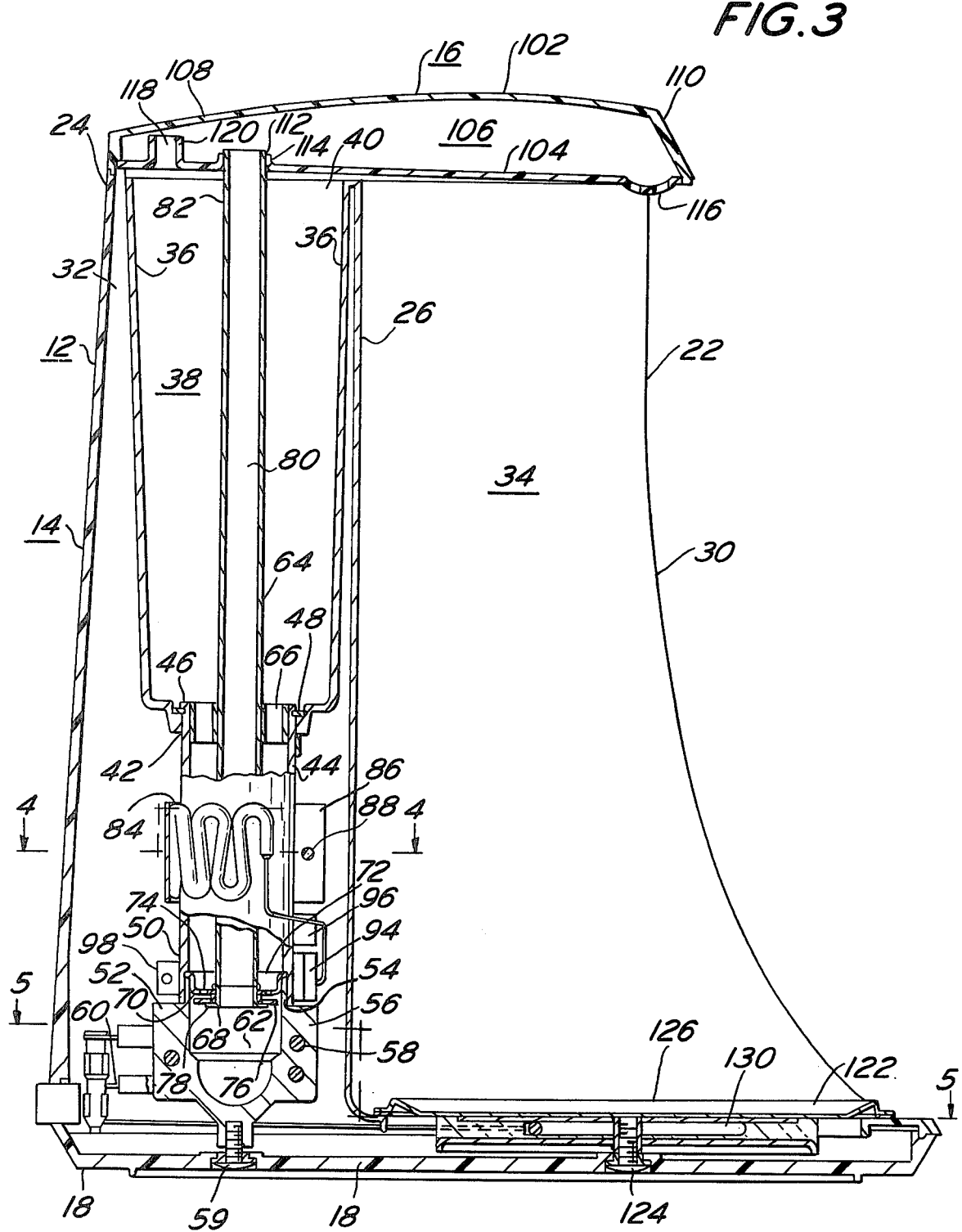

AUTOMATIC COFFEE BREWING DEVICE

This is a Continuation-In-Part application of our pending application Ser. No. 490,063 filed July 19, 1974 entitled "Automatic Coffee Brewing Device."

The invention relates to an automatic coffee making device, and particularly to a coffee brewing device which automatically heats and dispenses a quantity of hot water for one pass through ground coffee beans and a filter after which it is received in a container which is warmed until the brewed coffee is used.

Heretofore, coffee brewing devices have been made for preparing coffee by passing heated water through ground coffee beans and filter paper in a manner similar to that provided by the present invention. In brewing coffee by this method, it is essential that the water passed through the ground coffee beans be maintained within a desirable range of temperatures and at a temperature below the boiling point of water to enhance the quality of the brewed coffee. It is also desirable to efficiently produce a predetermined quantity of coffee when required by starting with cold water and providing same within a matter of minutes ready for use at a desired temperature.

It is therefore a primary object of the invention to provide a new and improved automatic coffee brewing device which accurately controls the temperature of the water passed through the ground coffee beans for obtaining a high quality coffee beverage.

Another object of the invention is to provide a new and improved automatic coffee brewing device which can efficiently prepare a predetermined quantity of coffee starting with cold water.

Another object of the invention is to provide a new and improved automatic coffee brewing device which quickly brews fresh coffee within a matter of minutes after starting the brewing operation.

Another object of the invention is to provide a new and improved automatic coffee brewing device which is inexpensive to manufacture, durable and trouble free in operation.

The above objects as well as many other objects of the invention are achieved by providing an automatic coffee brewing device comprising a structure having a cavity therein providing a reservoir for receiving water, a water heating and pumping means positioned under the reservoir, and a connecting means for delivering water from the reservoir to the heating and pumping means. The pumping means includes a riser tube extending from the heating means through the connecting means and the reservoir, the tube being heat conductive for transferring heat from the fluids pumped therethrough to the water in the connecting means and reservoir. The connecting means is a vertically extending tube depending from the reservoir and having a reduced water containing capacity with respect to that of the reservoir for causing a higher temperature rise for water contained therein with respect to the water contained in the reservoir.

The structure has an opening at its top communicating with the reservoir for receiving water therethrough to fill the reservoir. A cover member is received over and encloses the top opening of the structure and includes or has a separate water dispensing means with top and bottom walls enclosing a chamber therewithin. The dispensing means has a first opening over the reservoir of the structure for removably receiving therethrough the top of the riser tube of the pumping means, and a second opening for providing a water dispensing spout. A third opening in the bottom wall of the dispensing means is positioned over the reservoir of the structure for venting and returning heated fluid to the reservoir.

The coffee brewing device may also be provided with a supplementary heating element positioned proximate to the connecting means for supplying additional heat to the water in the connecting means prior to its delivery to the heating and pumping means. A warming plate is positioned under the spout of the cover means. A container positioned on the warmer plate receives a brew of coffee provided by the heated water from the spout passing through the ground coffee beans and filter.

Figure 8:
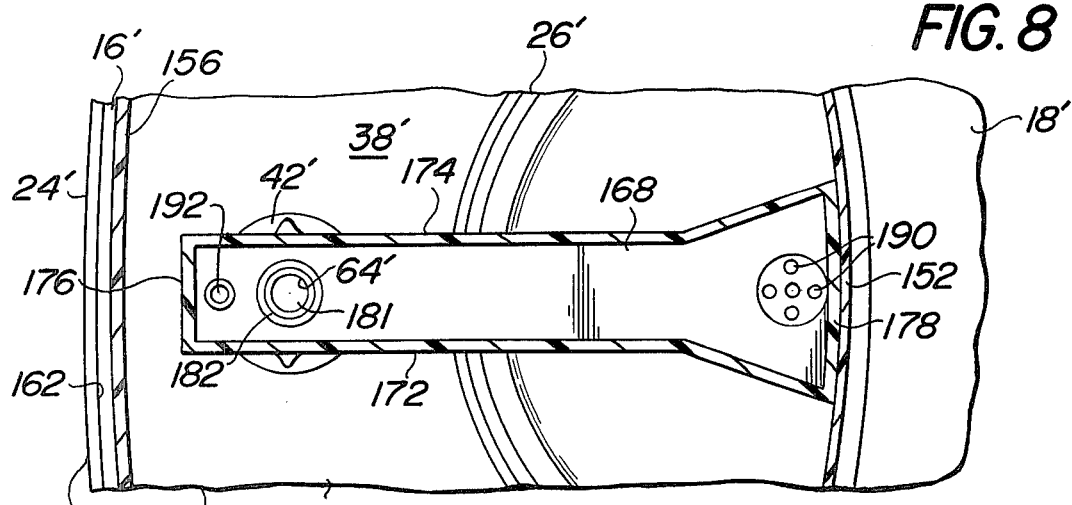
Figure 9:
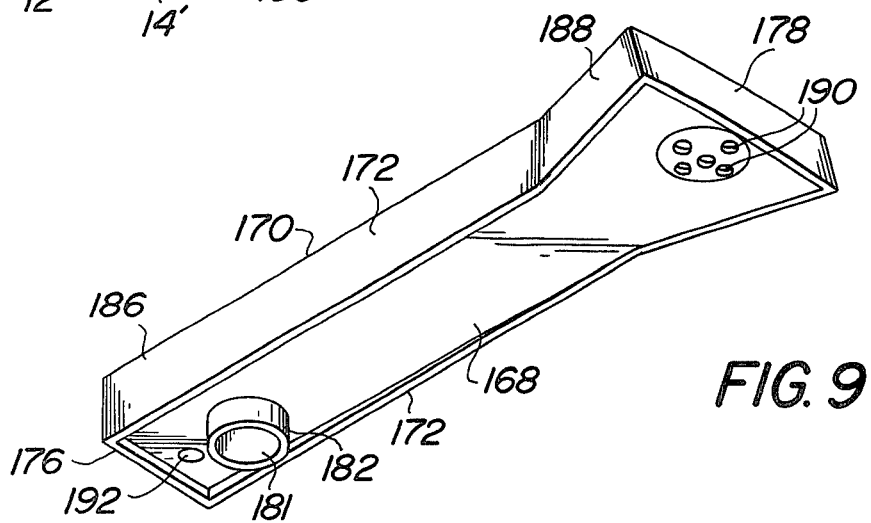

With the foregoing discussion in mind, this invention will be most readily understood from the following detailed description of a representative embodiment thereof, reference for this purpose being had to the accompanying drawing, in which:

FIG. 1 is a perspective view of an automatic coffee brewing device embodying the invention, FIG. 2 is a sectional view taken on line 2—2 of FIG. 1, FIG. 3 is an enlarged sectional view taken on the line 3—3 of FIG. 1, FIG. 4 is a sectional view taken on line 4—4 of FIG. 3 with portions broken away, FIG. 5 is a sectional view taken on line 5—5 of FIG. 3, FIG. 6 is a schematic drawing of the electrical circuit of the automatic coffee brewing device, FIG. 7 is an enlarged sectional view of the top portion of a modified form of the device illustrated in FIG. 1, FIG. 8 is a sectional view taken on line 8—8 of FIG. 7, and FIG. 9 is a perspective view of the spout portion shown in FIG. 7.

Like reference numerals designate like parts throughout the several views.

Refer to FIGS. 1 to 6 which illustrate an automatic coffee brewing device 10 embodying the invention. The device 10 comprises a structure 12 having a body 14 and a lid or cover 16 which may be made of molded plastic material. The body 14 has a horizontal base 18, with vertical side walls 20 and 22, and a back wall 24, which extends upwardly from the base 18. An intermediate wall 26 meets the downwardly sloping front edges 28 and 30 of the side walls 20 and 22, and curves inwardly to form at its rear an interior region 32 within the body 14, and a recessed region 34 at the front of the body 14.

A vertical wall 36 within the interior region 32 provides an enlarged cavity forming a reservoir 38 at the top of the body 14 having an opening 40 at its top for receiving cold water. The reservoir 38 has an opening 42 at its bottom for delivering water to a connecting tube 44.

The connecting tube 44 has a circular cross section with its top end 46 extending through the opening 42 of the reservoir 38 and locked therewith by a spring washer 48 which is received into an annular groove at the top end 46 of the tube 44. The tube 44 which is positioned below the reservoir 38 has a volume which is greatly reduced with respect to the volume of the reservoir 38. The connecting tube 44 may be made of metal having good thermal transfer characteristics.

The bottom end 50 of the connecting tube 44 is provided with an enlarged inside diameter which is threaded to engage a heating and pumping means 52 at its top end 54 which has threads on its outer surface. The heating and pumping means 52 comprises a unit 56 which may be a diecasting of metal with good thermal transfer characteristics. The unit 56 has embedded therein an insulated electrical winding of a heating element 58 provided with external terminals 60. The winding of the heating element 58 surrounds a well 62 formed in the unit 56 for receiving and heating water from the connecting tube 44.

The unit 56 of the heating and pumping means 52 is secured with the base 18 of the structure 12 by means such as the screw 59 shown in FIG. 3.

The heating and pumping means 52 also includes a riser tube 64 which may be made of a metal having good heat transfer characteristics. The tube 64 extends vertically through the connecting tube 44 and the reservoir 38 and is secured and positioned by a spacer bracket 66 at the top end 46 of the connecting tube 44. The bottom end 68 of the riser tube 64 receives about it a valve means 70 of the pumping means 52.

The valve means 70 comprises a dish shaped stationary portion 72 which has its center fixed about the end 68 of the tube 64 with its outer perimeter received and clamped between the shoulder formed at the bottom of the connecting tube 44 and the top 54 of the heating and pumping means 52. The portion 72 is provided with a plurality of openings 74 in its intermediate portion interconnecting the tube 44 with the well 62 of the heating and pumping means 52. A movable valve disk 76 is received about the end 68 of the riser tube 64 below the dish shaped portion 72 and rests upon the radially and horizontally extending flange 78 at the bottom end 68 of the riser tube 64 as shown in FIG. 3.

The disk 76 assumes its first opened condition for the valve means 70 by actuation of gravity in the absence of an upward pressure force thereon. When an upward pressure force is exerted on the valve disk 76, as when the water in the well 62 is sufficiently heated, the disk 76 moves upwardly to its closed position blocking the openings 74 and placing the valve in its closed position. In its closed position the valve means 70 prevents the movement of water from the reservoir 38 through the connecting tube 44 to the well 62 of the heating and pumping means 52. The opening 80 through the riser tube 64, however remains open at all times to receive heated water and steam generated in the well 62 of the heating and pumping means 52 and for delivering same upwardly to its top end 82, while transferring heat from such water and steam through the riser tube to the water in the connecting tube 44 and reservoir 38.

When it is desirable to further increase the heating and pumping action of the means 52, a supplementary heating element 84 is also provided. The heating element 84 is secured in position by a bracket 86 and fastening screw means 88, with its winding about and in close proximity to the outer surface of the connecting tube 44. The connecting tube 44 is made of a material such as metal to provide good heat transfer characteristics.

Means such as the cord 92 are provided for delivering electrical energization to the heating and pumping means 52 and the element 84. A circuit 93 including a temperature sensing thermostatic switch 94 and bypass resistor 96 which are secured by bracket means 98 at the bottom 50 of the connecting tube 44 and a main switch 100 which will be described in greater detail in connection with the schematic diagram in FIG. 6 are provided for controlling energization of the heating and pumping means 52 and the supplementary heating element 84.

The cover means 16 which is positioned at the top of the body 14, encloses the opening 40 and may readily be removed for allowing the reservoir 38 to be filled with a desired quantity of cold water in preparation for a coffee brewing operation. The cover means 16 has a top wall 102 and a bottom wall 104 enclosing therebetween a chamber 106. The back portion 108 of the cover means 16 is proximate to the back wall 24 of the body 14 and extends over and covers the opening 40 of the reservoir 38, while the front portion 110 of the cover means 16 extends to the front edges 28 and 30 of the side walls 20 and 22. The bottom wall 104 of the cover means 16 is substantially horizontal sloping downwardly from the back portion 108 to the front portion 110.

The cover means 16 has a first opening 112 provided with an upwardly extending circular edge 114 for removably receiving therethrough the top end 82 of the riser tube 64 as shown in FIG. 3. A second opening or a plurality of openings 116 are provided in the bottom wall 104 at the front portion 110 of the cover means 16 in a downwardly extending arcuate portion forming a spout for dispensing heated water dispensed by the brewing device 10. A third opening 118 is provided in the bottom wall 104 of the cover means 16 at its back portion 108 between the first opening 112 and the rear wall 24. The opening 114 is positioned over the opening 40 of the reservoir 38 when the cover means 16 is positioned over the body 14 as shown in FIG. 3 and is provided with a wall 120 which extends upwardly from the bottom wall 104 proximate to the underside of the top wall 102 of the cover means 16.

The body 14 of the structure 12 has a warming plate 122 secured by bolt means 124 to the base 18 within the recessed region 34 and under the spout openings 116 of the cover means 16. The warming plate 122 has a metal top plate 126 for receiving and supporting thereon a coffee container 128, such as that illustrated in FIG. 1 by dash lines, for being warmed by the heating element 130 positioned thereunder. The heating element 130 is connected in the circuit 93 for energization when the switch 100 is in the "on" position to maintain coffee within the container 128 at a desirable temperature.

The automatic coffee brewing device 10 is designed for brewing a predetermined number of cups of coffee starting with fresh cold unheated water in a matter of minutes. Thus the device 10 can achieve the brewing of, for example, 72 ounces or 12 cups of coffee of 6 ounces each, in approximately six minutes when the cover 16 is removed and 72 ounces of fresh water at 75° F is poured into the reservoir 38. After the reservoir is filled with water, the electrical actuating switch 100 is placed in its "on" position resulting in application of power to the main heating element 58 of the heating and pumping means 52 and to the supplementary heating element 84 when same is utilized. The application to the heating elements of approximately 1500 watts results in the rapid heating of water in the well 62 producing a slug of water and steam, which increases the pressure in the well 62 and closes the valve 70. The high pressure generated in the well 62 results in pumping action, by which the heated water and steam are forced upwardly through the opening 80 in the riser tube 64. In its upward travel, the heated water and steam transmit some of their heat through the walls of the riser tube to the volume of water within the connecting tube 44 as well as to the water in the reservoir 38. Since the volume of water in the connecting tube 44 is smaller than the volume of water contained in the reservoir 38, the same transfer of heat results in a greater rise in temperature for the water contained in the connecting tube 44. The water in the connecting tube 44 is by such means preheated in preparation for being received into the well 62 for the next heating and pumping action.

The heated water and steam which travels upwardly through the riser tube 64 is received from its upper end 82 into the chamber 106 in the cover means 16. The cover means 16 is preferably made of a heat insulating plastic material. The steam which rises to the top of the chamber 106 is vented by the opening 118 into the reservoir 38 where it delivers its heat to the water in the reservoir 38 for further raising its temperature. The heated water which is received over the bottom wall 104 of the cover means 16 flows because of its downward slope towards the front portion 110 and the spout openings 116. Since most of the steam is eliminated by the vent, 118, the spout 116 delivers mostly all water which has been reduced in temperature by the heat transfer through the walls of the riser tube 64 to a temperature below its boiling point in the range of 150° F to 200° F and preferably 195° F.

The water from the spout opening 116 drops downwardly into a filter 132 positioned under the spout openings 116 and retained at the top of the coffee container 128. The filter 132 which may be of a type well known in the art, receives within it a paper filter disk or bag containing ground coffee through which the heated water is passed. The water extracts desired coffee components from the ground coffee beans and is passed through the filter 132 into the container 128.

The Coffee Workshop Manual published by the Coffee Brewing Center states that is has been found that for best results it is necessary to begin with fresh cold water while the temperature of the water in contact with the coffee grounds should be within 5° F above or below 200° F. Higher temperatures may result in undesirable coffee flavor while lower temperatures will result in poor extraction, particularly in the lack of proper aroma which contributes much to desirable coffee flavor. The period of time during which coffee is brewed is also of importance and is dependent primarily on the grind, four to six minutes being desirable for drip grind and six to eight minutes for regular grind. Extending the time beyond those specified, results in the extraction of undesirable elements providing bitterness and astringency to the brew.

After the coffee has passed through the ground coffee beans and filter 132, the filter 132 is removed while the brewed coffee in the container 128 is maintained at a desirable temperature for use. Each time after a slug of water and steam are produced in the well 62 of the heating and pumping unit 52 and is caused to move upwardly through the riser tube 64, into the chamber 106 of the cover means 16, the pressure within the well 62 is normalized. This results in movement of the valve disk 76 to its open condition allowing a new charge of preheated water in the connecting tube 44 to move downwardly into the well 62 while the same is replaced in the connecting tube 44 by water from the reservoir 38. Upon the application of sufficient heat to the water in the well 62 of the heating element 58, the pressure is again built up and the valve 70 is again closed resulting in a repetition of the pumping action. This action continues until all of the water in the reservoir and the connecting tube 44 has been dispensed through the spout 116 in the cover means 16. The supplementary heating element 84 assists in the heating and pumping action by adding additional heat to the water within the limited capacity of the connecting tube 44 to the heat which is transmitted through the walls of the riser tube 64.

When the reservoir 38 and connecting tube 44 have delivered their entire content of water to the well 62 of the heating and pumping means 52, the absence of water in the well 62 causes the unit 56 of the heating and pumping means 52 to rise in temperature above 212° F, the boiling temperature of water. This rise in temperature is sensed by the thermostatic switch 94 which is positioned at the bottom 50 of the connecting tube 44 and the top of the heating and pumping means 52. When a predetermined temperature above 212° F is sensed the thermostatic switch 94 opens terminating delivery of electrical energization to the heating elements 58 and 84. Energization, however, is continued to the warming element 130 of the warming plate 122 until the main switch 100 is moved to its "off" position.

In considering the schematic diagram of the electrical circuit 93 in FIG. 6, it is noted that energization such as 110 volts, 60 Herz, is delivered by the cord 92 through the main switch 100 to the lines 134 and 136. An indicator light 138 in series with a limiting resistor 140 are connected between the lines 134 and 136 for indicating the "on" condition of the switch 100 and may be built into the switch 100. The main heating element 58 is connected in series with the thermostatic switch 94 between the lines 134 and 136. The thermostatic switch 94 is normally in its closed position allowing energization of the main heating element 58 when the switch 100 is closed at the beginning of a coffee brewing operation. When the supplementary heating element 84 is utilized, it is connected in parallel with the main heating element 58. At the end of the brewing operation when the thermostatic switch 94 senses the absence of water in the heating and pumping unit 52, it assumes its open condition as illustrated in FIG. 6 deenergizing the heating elements 58 and 84. The bypass resistor 96 which is connected across the thermostatic switch 94 is utilized for maintaining a minimum level of heat which is transmitted to the thermostatic switch 94. This prevents the closing of the thermostatic switch 94 and recycling action unless cold water is first received by the device 10 for initiating a new brewing operation.

The warmer plate element 130 is directly connected between the lines 134 and 136 so that energization is delivered at all times during which the main switch 100 is in its closed position. Thus, after the completion of the brewing operation, and the deactivating of the main and supplementary heating elements 58 and 84, energization is continued to the warmer plate to maintain the brewed coffee at a desired temperature.

The configuration and arrangement of the reservoir 38, connecting tube 44, and heating and pumping means 52 providing for the feedback of heat through the riser tube 64 and for the rise of the temperature of water prior to its delivery to the main heating element results in increased efficiency and speed and provides conditions under which a high quality brew is achieved. The use of the supplementary heating element 84 about the connecting tube 44 also assists in achieving the desired brewing operation under particular design circumstances.

The utilization of the cover means 16 providing a chamber 106 therein for returning steam to the reservoir to heat the water therein, while delivering water at is spout openings which has had its temperature reduced to the desired degree with the elimination of steam also increases the efficiency as well as the quality of the brewed coffee.

The FIGS. 7, 8 and 9 illustrate an automatic brewing device 10' which is a modified form of the device 10 shown in FIGS. 1 to 6. The brewing device 10' is substantially similar to the brewing device 10 except for the differences which are described below in detail. The brewing device 10' comprises a structure 12' having a body 14' with a lid or cover 16' which may also be made of molded plastic material. The body 14' has a horizontal base 18', a pair of vertical side walls 20' and a back wall 24'. An intermediate wall 26' meets the front edges 30' of the side walls 20', and curves inwardly to form a recessed region 34' at the front of the body 14'.

The pair of vertical side walls 20', the back wall 24' and the intermediate wall 30' form with a bottom wall 150, a reservoir 38' at the top of the body 14' having an opening 40' at its top for receiving cold water. The reservoir 38' has an opening 42' in the bottom wall 150 for delivering water to the connecting tube 44 (not shown) as described above in connection with the automatic coffee brewing device 10.

The cover means 16' is positioned at the top of the body 14' enclosing the opening 40' and may readily be removed for allowing the reservoir 38' to be filled with a desired quantity of cold water in preparation for a coffee brewing operation. The cover means 16' has a top wall 151 and a downwardly extending front, side and back walls 152, 154 and 156 forming a cavity 158 therewithin. The bottom edges 160 of the side walls 154 and back wall 156 of the cover means 16' engage and are supported on the top edges 162 of the side walls 20' and rear wall 24' of the body 14'. The front end 164 of the cover means 16' overhangs and extends beyond the intermediate wall 26', and the front edges 30' of the side walls 20'.

An elongated horizontally extending water dispensing means 166 which may be made of heat resistance plastic material is provided having a bottom wall 168, a top wall 170, a pair of side walls 172, 174 and back and front walls 176, 178. The walls of the water dispensing means 166 enclose therein a chamber 180. The water dispensing means 166 has an opening 181 provided with a tubular portion 182 communicating with the chamber 180 therein. The tubular portion 182 receives within its opening 181, the top end of a riser tube 64', which may be identical to the riser tube 64 of the device 10. The riser tube 64' receives about it an outer tube 184 which may be made of a plastic or other suitable material. The outer tube 184 extends up to and engages the bottom of the tubular portion 182 of the water dispensing means 166 providing a stop for retaining the dispensing means 166 at the top of the riser tube 64'. The dispensing means 166 is thus retained at the top of the structure 12' with its rear portion 186 positioned over the opening 40' and its front portion 188 extending forwardly within the cavity 158 of the cover means 16', so that its front wall 178 contacts the inside surface of the front wall 152 of the cover means 16'.

In addition to the first openings 181, a second opening or a plurality of openings 190 are provided in the bottom wall 168 at the front portion 188 of the dispensing means 166. The openings 190 are provided in a downwardly extending arcuate portion forming a spout for dispensing heated water dispensed by the brewing device 10'. The botton wall 168 is substantially horizontal sloping downwardly in the direction from the first opening 181 toward the second openings 190. A third opening 192 is provided in the bottom wall 168 of the dispensing means 166 at its rear portion 186 between the first opening 181 and the back wall 176. The opening 192 is positioned over the opening 40' of the reservoir 38' as clearly shown in FIG. 7, and is provided with a wall 194 which extends upwardly from the bottom wall 168 proximate to the underside of the top wall 170 of the water dispensing means 166.

When fluid in the form of heated water and steam travels upwardly through the riser tube 64', it is received into the chamber 180 of the water dispensing means 166. The steam rises to the top of the chamber 180 and is vented by the opening 192 into the reservoir 38' where it delivers its heat to the water in the reservoir 38' for further raising its temperature. The heated water which is received over the bottom wall 168 of the dispensing means 166 flows because of a downward slope of the bottom wall 168, toward the front portion 188 and the spout openings 190. As in the case of the brewing device 10, most of the steam is eliminated by the vent 192, so that the spout 190 delivers mostly all water which has been reduced to a temperature below its boiling point and is in the range of 150° F to 200° F and preferably 195° F.

The advantages of the modified form of the device 10' are provided by the water dispensing means 166 which is secured with the riser tube 64' and enclosed by the cover 16'. The dispensing means 166, therefore, remains in place when the cover means 16' is removed for filling the reservoir 38' with fresh water. The cover means 16' is easily removed and replaced by merely placing it upon the edges 162 of the structure 12' and no alignment with the riser tube 64' is required as in the case of the device 10.

While the invention has been described and illustrated with reference to a specific embodiment it will be understood that the invention is capable of various modifications and applications not departing essentially from the spirit thereof, which will become apparent to those skilled in the art.

What is claimed is:

1. An automatic coffee brewing device comprising a structure having a cavity therein providing a reservoir for receiving water, a water heating and pumping means positioned under the reservoir, an elongated tubular connecting means extending vertically between said reservoir and said heating and pumping means having a top end secured with the bottom of the reservoir and a bottom end secured to the top of said heating and pumping means for delivering water from the reservoir to the heating and pumping means, said pumping means including a valve for receiving water from said connecting means and a riser tube for receiving heated water from said heating and pumping means having a bottom end secured with said valve and extending upwardly and centrally through said connecting means and vertically through said reservoir, said tube being heat conductive for transferring heat from the fluids pumped therethrough to the water in said connecting means and reservoir, and water dispensing means receiving and dispensing externally the fluids being pumped through the riser tube, the connecting means having a water containing capacity greater than that of the heating and pumping means and a reduced water containing capacity with respect to that of the reservoir for causing a higher temperature rise for water contained therein with respect to the water contained in the reservoir, said structure having an opening at its top communicating with its reservoir for receiving water therethrough to fill said reservoir, and including a cover member received over and enclosing the top opening of said structure, said cover member including said dispensing means and having bottom and top walls enclosing a chamber therein, said cover member having a first opening over the reservoir of said structure for removably receiving therethrough the top end of the riser tube of said pump, the bottom wall of said cover member having a second opening for providing a water dispensing spout, and a third opening over the reservoir of said structure for venting and returning heated fluid to said reservoir.

2. The coffee brewing device of claim 1 in which said cover member has first and second ends with its bottom wall sloping downwardly from its first end toward its second end, said first and third openings being proximate to the first end while the second opening in the bottom wall of said cover member is proximate to its second end, said third opening of said cover member having an upstanding edge extending into the chamber of said cover means for allowing steam to pass therethrough from the chamber to the reservoir while the heated water flows toward the second opening for being dispensed therethrough.

3. The coffee brewing device of claim 2 in which the heating and pumping means includes a unit having a well for receiving water therein from the connecting tube and a heating element for heating the water received therein, and said valve assembly having a first open position and a second closed position, water from the connecting tube being passed into the well of said unit only when said valve assembly is in its open position, the riser tube having a bottom end secured over the well of said unit with said valve assembly positioned between the bottom end of the riser tube and the top of said unit.

4. The coffee brewing device of claim 3 in which said heating element of said unit produces a slug of steam and heated water increasing the pressure in the well of said unit to activate the valve assembly to its closed position and force the steam and heated water up the riser tube transferring heat by conduction from the fluids pumped therethrough to the water in the connecting means and reservoir, said steam and heated water being delivered to the chamber of the cover member for return of heat in the form of steam through the third opening thereof into the reservoir with the dispensing of heated water below boiling temperature at the spout provided by the second opening for a single pass through ground coffee beans for brewing coffee.

5. The coffee brewing device of claim 1 which includes a supplementary heating element positioned proximate to the connecting means for preheating water therein prior to the delivery of water to said heating and pumping means for accelerating the action of the heating and pumping means.

6. The coffee brewing device of claim 1 including a temperature sensing means detecting the absence of water in the reservoir and connecting tube for deactivating said heating means upon termination of the brewing operation.

7. The coffee brewing device of claim 1 in which said structure is provided with a warming plate under the spout of said cover means for receiving a coffee container thereon.

* * * * *